Figure 5:
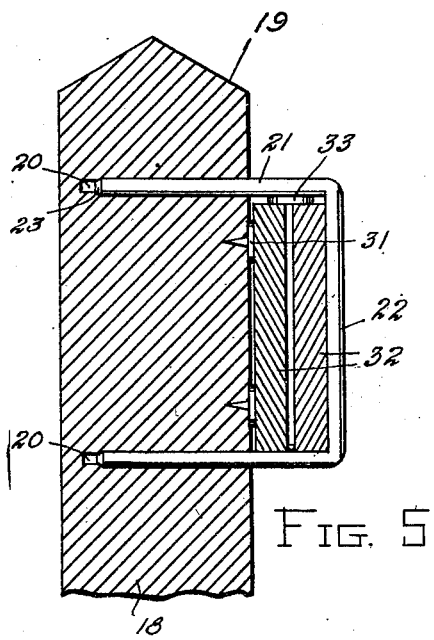

Dec. 13, 1932.　　　T. H. SYMINGTON　　　1,890,631
BOARD FENCE
Filed Sept. 4, 1931　　　2 Sheets-Sheet 1
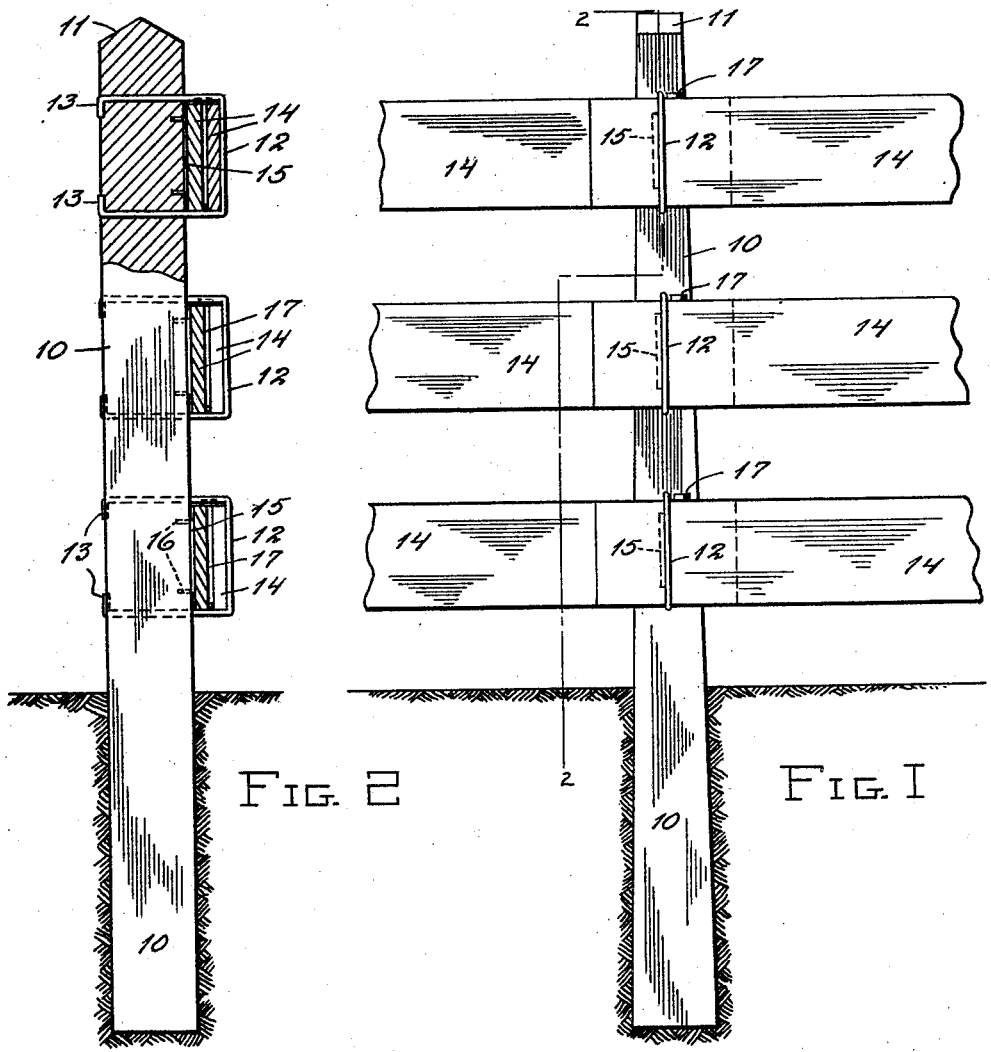
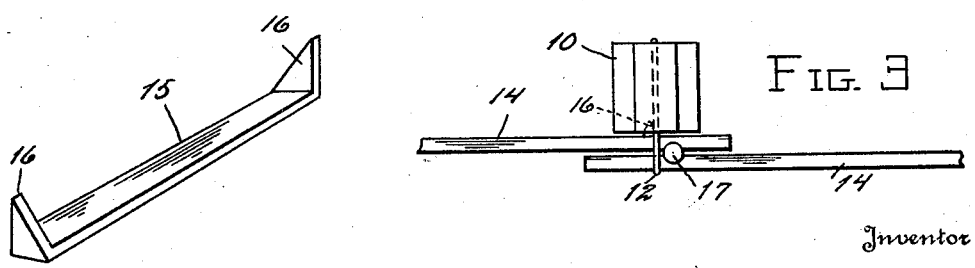
Inventor
Thomas H. Symington
By John Milton Jester
Attorney Dec. 13, 1932.  T. H. SYMINGTON  1,890,631
BOARD FENCE
Filed Sept. 4, 1931  2 Sheets-Sheet 2

Inventor
Thomas H. Symington
By John Milton Lester
Attorney

Patented Dec. 13, 1932

1,890,631

UNITED STATES PATENT OFFICE

THOMAS H. SYMINGTON, OF BALTIMORE, MARYLAND, ASSIGNOR, BY MESNE ASSIGNMENTS, OF ONE-HALF TO EDITH R. SYMINGTON AND ONE-HALF TO THOMAS R. SYMINGTON, BOTH OF BALTIMORE, MARYLAND

BOARD FENCE

Application filed September 4, 1931. Serial No. 561,247.

The invention relates to fences, particularly to those of the plank type, and has for its principal object the provision of a novel fence embodying posts equipped with special means for supporting and holding in secured relation a plurality of planks or boards which are maintained in uniformly spaced relation so that the fence will have a neat and attractive appearance.

An important object of the invention is to provide a fence in which all of the planks or boards, or their equivalent are individually held with their ends in overlapping relation so that the fence will have great strength and be able to withstand quite a severe strain such as might result from an animal or vehicle striking against it.

Another object is to provide a fence embodying a series of vertically spaced planks or boards with means for supporting them individually so that in the event of breakage of an upper one, as might readily occur in hunting country, the person causing the damage may be able to remove a broken top plank and replace it by one of the lower ones so that the value of the fence in preventing escape or straying of cattle or the like will be practically unimpaired.

Another important object of the invention is to provide a fence embodying posts each provided with a vertically arranged series of retaining members extending entirely through and clinched upon the rear side of the post, in one modification, for retaining the overlapping ends of boards or planks, and compressingly engaging within sockets in the preferred form, to insure the proper holding action, it being moreover a feature that the planks nearest the post are spaced therefrom and the overlapping ends likewise spaced apart for the purpose of preventing accumulation of water at these points with resultant decay.

Another object is to provide a fence in one form of which the spacing members located between the post and the adjacent boards are of peculiar form so that when penetratingly engaged within the post there will be practically no risk of starting a split, this being of particular importance in connection with posts made of certain types of wood.

A further object is to provide a jig or guide for properly positioning the brackets within the sockets provided for their reception and insuring driving in thereof to the exact proper extent.

An additional object is to provide a fence possessing these advantageous characteristics and which will at the same time be simple and inexpensive to manufacture, easy to assemble or build, positive in action, efficient and durable in service, and a general improvement in the art.

Figure 6:
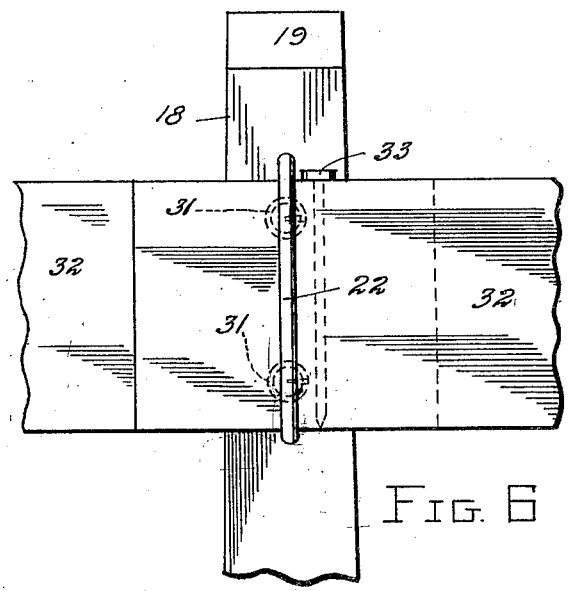
Figure 8:
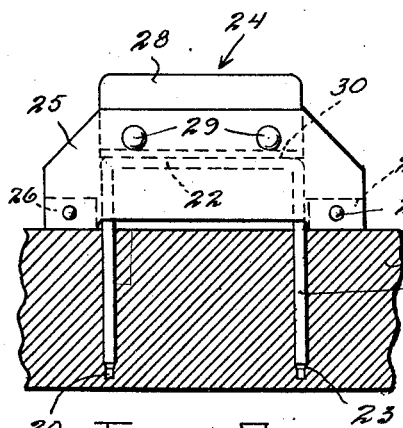
Figure 7:
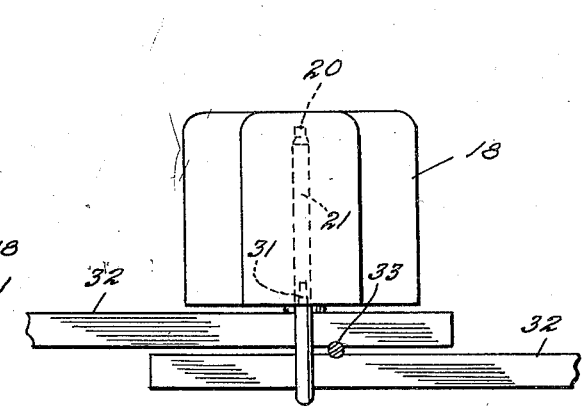
Figure 9:
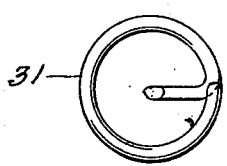
Figure 10:
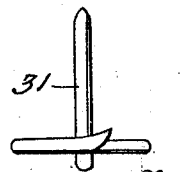

To the attainment of the foregoing and other objects and advantages, the invention preferably consists in the details of construction and the arrangement and combination of parts to be hereinafter more fully described and claimed, and illustrated in the accompanying drawings in which:

Figure 1 is a fragmentary elevation of a fence constructed in accordance with one form of my invention, Figure 2 is a vertical cross section taken on the line 2—2 of Figure 1, Figure 3 is a plan view of what is shown in Figure 1, Figure 4 is a detail perspective view of one of the spacing members, Figure 5 is a fragmentary section through a post showing the preferred form of bracket mounting, Figure 6 is a front elevation of what is shown in Figure 5, Figure 7 is a top plan view thereof, Figure 8 is a fragmentary section through a post showing the jig for applying the brackets thereto, Figure 9 is an elevation of the preferred type of spacing member, Figure 10 is an edge view thereof.

Referring more particularly to the drawings, and especially Figures 1 to 4, the fence comprises a plurality of posts, only one of which is shown as such is entirely adequate to a proper understanding of the invention. The posts 10 are intended to be of wood and may be of any desired dimensions depending upon the contemplated height of the fence and other conceivable factors. While in the present instance the post is represented as tapered it may of course be of uniform width throughout if preferred. The top is preferably beveled off at 11 to facilitate draining off of water and reduce "checking". The posts may be anchored directly in the ground itself, as shown, or embedded in masses of concrete, this detail being immaterial.

Carried by the post is a series of vertically spaced retaining brackets 12 here represented as of U-shape having their arms extending through the post with their ends clinched or bent over toward each other at the rear side as shown at 13. Actually the practice is to bore holes through the post of slightly less diameter than the rods from which these brackets are formed and then to force the arms through, the resultant compression of the wood operating to provide an adequate grip or frictional engagement with the brackets to maintain them in proper position. These bracket members 12 receive and hold the overlapping ends of boards or planks 14 which may be of any desired width, thickness and length depending on circumstances. Those boards adjacent the post are held out of engagement therewith by spacing members 15 which may conveniently be formed from sheet metal stamped to define terminal prongs 16 penetratingly engaged within the post. Preferably the prongs 16 are offset with respect to each other so as to reduce the tendency of splitting the surface of the post. The employment of these spacers will prevent contact of the boards with the post and consequently moisture will not accumulate and cause rotting as the space will permit circulation of the air so that after a rain the wood may dry out.

It is preferable that the overlapping ends of the boards be spaced from each other for the same reason and I have found that a very simple expedient is to force in a large sized nail 17 between the overlapping ends of the boards. This will naturally separate the boards to a certain extent and will also force the boards into close engagement with the spacers 15 and the bight portions of the brackets 12. Moreover the forcing in of the nail will cause it to mash into the confronting faces of the overlapping ends of the boards and this engagement will be sufficient to prevent the overlapping boards from having relative longitudinal movement.

To simplify the operation of constructing the fence I have found that by far the preferred form of the invention is that illustrated in Figures 5 to 10 of the drawings. Referring to these views in detail, the numeral 18 designates the post having a beveled upper end 19 and preferably tapered throughout its length. Instead of forming holes all the way through the post for mounting bracket as above described, I bore pairs of spaced holes only part way through to define sockets 20 to receive and frictionally hold the arms 21 of U-shaped brackets 22, the arms being of somewhat greater diameter than the sockets and having their ends beveled off or tapered at an angle of preferably about 30°, as shown at 23. This particular taper or chamfer is of great importance as the reduction of the size of the ends of the arms facilitates their initial entry within the sockets and causes compression of the wood at the walls of the recesses without shearing or tearing it, this compression providing sufficient holding power that the bracket arms will be gripped firmly and maintained positively in place without danger of loosening at any time even though the post may dry out as it will in hot weather.

To enable the brackets to be properly placed, I may make use of the jig shown in Figure 8, this device 24 comprising metallic members or plates 25 spaced apart by blocks 26, riveted in place at 27, and an impact receiving member 28 secured at 29, the latter being grooved at 30 to receive the bight portion of a bracket 22 which has its arms 21 confined between the guide blocks 26. A bracket to be inserted in the post is placed within the jig 24, as shown in Figure 8, with its arms projecting therebeyond. The beveled ends of the arms are placed at the entrances to the sockets 20 and a few blows are struck with a hammer upon the impact receiving member 28 so as to drive the arms into the sockets until the edges of the plates 25 touch the post. The jig is then removed. The dimensions are of course carefully gaged to insure proper projection of the bracket. This is done prior to the mounting of the posts in the ground or anchoring within cement bases.

Before the brackets are placed in position I equip the post with spacing members which could be as shown in Figure 4 but which are preferably coiled headed members 31 formed of wire or the like penetratingly engaged in the post adjacent the brackets and preferably at the center line.

Everything being thus in readiness the desired number of posts should be set in the ground and the necessary number of boards 32, corresponding to the boards 14, engaged within the brackets with their ends in overlapping relation. Nails 33, like those at 17, are then forced in between the ends to hold the boards against longitudinal displacement and the work is complete.

Clearly a fence constructed in either manner disclosed is very easy to build, it being of course understood that the spacing members 15 or 31, as the case may be, are driven into the post before the boards are slipped into the brackets 12 or 22 with their ends overlapping. The nails 17 or 33 are driven in last. This type of fence is particularly advantageous for example in hunting country where riders occasionally break the top rail in jumping their mounts. In case this should happen it is a simple matter for one to remove the broken top board, after the nail 17 or 33 is withdrawn, and replace it by one of the boards taken from the bottom part of the fence so that cattle or horses within a field may not escape.

From the foregoing description and a study of the drawings it will be apparent that I have thus provided an extremely simple, inexpensive as well as neat and attractive fence which will be particularly efficient and which on account of the provision of means for spacing the boards from the post and from each other will be much less liable to decay than is ordinarily the case so that the fence should have unusual durability.

While I have shown and described the preferred embodiment of the invention and certain specific elements it should be understood that the disclosure is merely an exemplification of the principles involved and that the right is reserved to make all such changes in the details of construction and the form of the parts as will not depart from the spirit of the invention or the scope of the claims hereunto appended.

Having thus described the invention, I claim:

1. In a fence structure, a post provided with a series of vertically spaced retaining brackets projecting from one face thereof, a pair of boards having their ends overlapped and slidably engaged within each of said brackets and embraced thereby, means other than said bracket interposed between the post and the confronting face of the adjacent board for spacing them apart, and other means engaged between the overlapping ends for spacing them apart.

2. In a fence structure, a post having pairs of horizontally extending openings therein, U-shaped brackets having their arms engaged within said pairs of openings, a pair of boards having their ends overlapped and engaged within each bracket, and a penetrating member interposed between the post and the confronting face of the adjacent board for spacing said board from the post.

3. In a fence structure, a post having pairs of horizontally extending holes therethrough, U-shaped brackets having their arms engaged through said pairs of holes with the ends of the arms upset at the back of the post, a pair of boards having their ends overlapped and engaged within each bracket, and means interposed between the post and the confronting face of the adjacent board and penetratingly engaged within the former for spacing said board from the post.

4. In a fence structure, a post having pairs of horizontally extending holes therethrough, U-shaped brackets having their arms engaged through said pairs of holes with the ends of the arms upset at the back of the post, a pair of boards having their ends overlapped and engaged within each bracket, and means compressingly engaged between the overlapping ends of the boards for forcing the outermost one against the bight portion of the bracket and for preventing relative longitudinal movement of the boards.

5. In a fence structure, a post having pairs of horizontally extending holes therethrough, U-shaped brackets having their arms engaged through said pairs of holes with the ends of the arms upset at the back of the post, a pair of boards having their ends overlapped and engaged within each bracket, a member located between the post and the confronting face of the adjacent board for spacing the same apart, said members having terminal prongs penetratingly engaged within the post, and other members compressingly engaged between the overlapping ends of the boards for forcing the outer and inner ones respectively against the bight portion of the bracket and said spacing member, said last named means operating to prevent relative longitudinal movement of the boards.

6. In a fence structure, a post having pairs of horizontally extending holes therethrough, U-shaped brackets having their arms engaged through said pairs of holes with the ends of the arms upset at the back of the post, a pair of boards having their ends overlapped and engaged within each bracket, and means interposed between the post and the confronting face of the adjacent board and penetratingly engaged within the former for spacing said board from the post, said means comprising an elongated member having right angularly extending terminal prongs offset with respect to each other.

7. In a fence structure, a post, a plurality of vertically spaced substantially U-shaped brackets carried thereby and projecting from one face thereof, a pair of boards having their ends overlapped and slidably engaged within each bracket, spacing members penetratingly engaged within the post and spacing away the adjacent board, and other spacing members extending transversely of the boards and compressingly engaged therewith for spacing them apart and for preventing relative longitudinal movement.

8. In a fence structure, a post provided with a plurality of retaining brackets projecting outwardly from one face thereof, a pair of boards having their ends overlapped and engaged within each of said retaining brackets, means carried by the post for spacing away the adjacent boards, and nails arranged substantially vertically between the overlapping ends of the boards and in compressing engagement therewith for holding them apart and for preventing relative longitudinal movement.

9. In a fence structure, a post provided with a plurality of pairs of vertically spaced holes, a U-shaped bracket having its arms within said holes in compressing engagement with the walls thereof so as to be frictionally gripped, a pair of boards having their ends overlapped and engaged within each of said brackets, means for spacing the boards away from each other and means other than the bracket for spacing the board nearest the post away from the same.

10. In a fence structure, a post provided with a plurality of pairs of holes extending partly therethrough, U-shaped brackets having their arms engaged within said holes, said arms being of greater diameter than the holes to cause compression of the walls thereof, said arms having tapered ends, a pair of boards having their ends overlapped and engaged within each of said brackets, means other than the brackets for spacing the board nearest the post away from the same, and other means for spacing the boards apart.

11. In a fence structure, a post provided with a series of pairs of vertically spaced holes extending partly therethrough and constituting sockets, a U-shaped bracket having its arms engaged within each pair of sockets, the arms being of greater diameter than the sockets to cause compression of the walls thereof and being of less length than the depth of the sockets to avoid splitting the post at the bottoms thereof, the ends of the arms being tapered at an acute angle to facilitate passage into the sockets and to prevent tearing of the material, and boards mounted within the bight portions of the brackets and confined between the same and the post.

In testimony whereof I affix my signature.

THOMAS H. SYMINGTON.